US008114425B2

(12) United States Patent
Donath et al.

(10) Patent No.: US 8,114,425 B2
(45) Date of Patent: Feb. 14, 2012

(54) PROCESS FOR THE PRODUCTION OF WOOD-BASED MATERIALS

(75) Inventors: Steffen Donath, Gotha (DE); Thomas Jaetsch, Köln (DE); Peter Spetmann, Leverkusen (DE); Tobias Zahlmann, Langenfeld (DE); Andreas Böttcher, Köln (DE); Erasmus Vogl, Leverkusen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 338 days.

(21) Appl. No.: 12/424,128

(22) Filed: Apr. 15, 2009

(65) Prior Publication Data

US 2010/0015194 A1 Jan. 21, 2010

(30) Foreign Application Priority Data

May 9, 2008 (DE) ......................... 10 2008 023 085

(51) Int. Cl.

| | |
|---|---|
| ***A01N 25/08*** | (2006.01) |
| *B05D 7/00* | (2006.01) |
| *B05D 1/36* | (2006.01) |
| *B32B 21/06* | (2006.01) |
| *B32B 29/00* | (2006.01) |
| *B32B 23/04* | (2006.01) |
| *B32B 23/06* | (2006.01) |
| *B32B 21/04* | (2006.01) |
| *B41J 2/16* | (2006.01) |
| *C09J 5/02* | (2006.01) |
| *D21H 11/00* | (2006.01) |
| *D21H 13/00* | (2006.01) |
| *A01N 43/40* | (2006.01) |
| *A01K 31/44* | (2006.01) |
| *C09D 5/16* | (2006.01) |

(52) U.S. Cl. ..................... 424/409; 156/307.4; 156/326; 162/161; 427/408; 428/535; 428/536; 428/537.1; 514/342; 523/122

(58) Field of Classification Search .................. 424/405, 424/407, 769, 770, 771, 779, 409; 514/277, 514/326, 331; 156/307.4, 326; 162/161; 427/408; 428/535, 536, 537.1; 523/122
See application file for complete search history.

(56) References Cited

U.S. PATENT DOCUMENTS

| | | | | |
|---|---|---|---|---|
| 7,544,423 | B2 * | 6/2009 | Horton | 428/535 |
| 2007/0044911 | A1 * | 3/2007 | Horton | 156/307.4 |

FOREIGN PATENT DOCUMENTS

| | | |
|---|---|---|
| DE | 10 2005 043428 | 3/2007 |
| FR | 2 528 755 | 12/1983 |
| WO | 98/18328 | 5/1998 |
| WO | 2005/098135 | 10/2005 |
| WO | 2007/028528 | 3/2007 |

OTHER PUBLICATIONS

European Search Report—EP 09 15 9546 filed Jun. 23, 2009.

* cited by examiner

*Primary Examiner* — Johann Richter
*Assistant Examiner* — Jane C. Oswecki
(74) *Attorney, Agent, or Firm* — Nicanor A. Kohncke

(57) ABSTRACT

Process for the production of wood-based materials containing wood parts, comprising the steps
a) bringing wood parts into contact with
a1) alkaline binder and
a2) thiacloprid and
b) pressing a bed of wood parts, containing wood parts treated according to step a), under pressure at a temperature of the press contact surfaces of 126° C. to 240° C.

8 Claims, No Drawings

PROCESS FOR THE PRODUCTION OF WOOD-BASED MATERIALS

The invention relates to a process for the production of wood-based materials, the use of thiacloprid for protecting wood-based materials from insects, and corresponding wood-based materials per se.

All preservatives which are also suitable for protecting solid wood are in principle suitable for protecting wood-based materials. The application of the preservatives can be effected by a pre-manufacture treatment, in-process treatment or post-manufacture treatment.

In the treatment by pre-manufacture treatment and by in-process treatment, temperatures up to 200° C. in the presence of alkaline substances (e.g. pH 11-13 in the case of phenolic glues) can occur. These process conditions affect the preservative and may cause degradation of the preservative. In an alkali medium, many insecticides are readily degraded, in particular at elevated temperatures.

In the search for alternative insecticides which represent high efficiency in combination with an acceptable toxic profile, thiacloprid may be mentioned. However, the property profile of the thiacloprid prevents the in-process or the pre-manufacture treatment under alkaline conditions.

Testing of these properties showed that, for example, thiacloprid was completely degraded at 75° C. after only 15 min in an NaOH solution having a pH of 13.7 (cf. Example 1).

For a similar class of systemic insecticides, namely imidacloprid, the use is described in WO98/18328 for pre-manufacture or in-process applications, but only from moderate temperatures of the contact surfaces of the press up to 125° C. (cf. Examples).

Particularly for the production of the so-called oriented strand boards (OSB), a class of wood-based materials, these conditions are however not sufficient. Alternative routes for protecting wood-based materials from attack and/or degradation by insects were sought, which routes are also suitable for such drastic conditions.

Thus, for example during pressing of the chip mats to give the OSBs, a temperature of up to 200° C. occurs on the contact surface with the press tool, which temperature, for example is not absorbed by the outer boards of a plywood but acts directly on the active substance. Other examples of WO98/18328 describe the use of imidacloprid, for example, with pH-neutral urea glue (cf. Example 5), which however is not the source of major stress for the active substance.

Surprisingly, it was found that highly effective protection from termites is achieved if wood preservatives according to this invention are incorporated into wood-based materials which are exposed to very high temperatures during the production process in the presence of alkaline glues. The termite resistance was detectable in particular on the surfaces of the wood-based materials, which were in direct contact with press tools heated to 190-200° C.

The invention therefore relates to a process for the production of wood-based materials containing wood parts, comprising the steps a) bringing wood parts into contact with a1) alkaline binder and a2) thiacloprid and b) pressing a bed of wood parts, containing wood parts treated according to step a), under pressure at a temperature of the press contact surfaces of 126° C. to 240° C.

The process according to the invention is suitable in particular for the production of oriented strand boards (OSB, wood-based materials comprising long slim oriented chips), laminated wood (wood-based materials containing veneer layers or veneer sections which have a surface interrupted by glue joints), fibre boards (wood-based materials comprising fibrous wood particles) or chipboards (wood-based materials comprising short chips).

Preferred wood-based materials are OSBs, chipboards and fibre boards.

Different wood parts are suitable as a basis for the production of wood-based material.

Wood parts preferably used in step a) of the process are:

wood veneer layers and/or sections, preferably having a thickness of 0.5 to 5 mm and a length of 50 to 400 cm wood chips, in particular for OSB, preferably having a width of 10 to 15 mm and a thickness of 0.6 to 0.8 mm and a length of 5 to 20 cm wood chips having a length of 0.4 to 15 mm fibres having a length of 0.4 to 6 mm Suitable alkaline binders al) are solid or liquid binders, preferably as aqueous solutions or emulsions, in particular in an aqueous form having a binder content of 10 to 60% by weight, preferably of 35 to 50% by weight. In particular, those which have a pH of 10-13.5 in the form of 35 to 50% strength by weight aqueous solution are preferably used.

Alkaline phenol binders (PF) and/or phenol-urea-formaldehyde binders (PUF) are preferred.

The alkaline binder is preferably applied as an aqueous solution to the wood parts. The phenolic binders present in solution preferably contain oligomeric to polymeric chains. Furthermore, the binder used, preferably as a solution, contains in particular 1-13% by weight of alkaline compounds, in particular sodium hydroxide.

The concomitant use of non-alkaline binders is also possible. For example, the following are suitable as such: polymethylene diisocyanate (PMDI), urea glues (UF), melamine-reinforced urea glues (mUF), melamine glues (MF), melamine-urea-formaldehyde glues (MUF), melamine-urea-phenol-formaldehyde glues (MUPF), resorcinol-formaldehyde glues (RF), polyvinyl acetate glues (PVAc).

Particularly in the case of OSBs, the beds or mats of wood parts which are used for pressing contain as a rule a top and a bottom layer (outer layers) comprising coarser, identically treated wood parts and enclose at least one middle layer, optionally comprising the finer wood parts. The middle layers can preferably also contain a non-alkaline binder or non-phenolic binder, for example a PMDI binder.

Large-volume drums are preferably used for gluing the wood parts (for OSB, also referred to as strands).

The amount of glue and chemicals used varies according to the board quality, board thickness and method of glue application. In the case of OSB production, different glue types can be used for the outer and middle layers. Preferably phenol binders (PF), phenol-urea-formaldehyde binders (PUF), MUPF (melamine-urea-phenol-formaldehyde) or MUF (melamine-urea-formaldehyde) binders are used in the outer layer and PMDI (polymethylene diisocyanate) binder in the middle layer.

The wood parts are brought into contact with thiacloprid, an insecticide of the formula

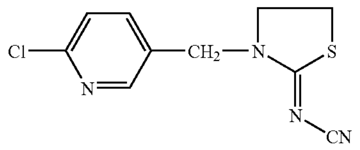

either separately or together with the alkaline binder. The sequence of addition is unimportant. Preferably, thiacloprid is applied as an aqueous solution having a content of 0.2 to 10% by weight, in particular 0.2 to 2% by weight, of active substance to the wood parts. Thiacloprid can also be mixed with the binder.

It is also possible to use extenders and fillers for influencing the adhesive bonding and the processability of the wood-based material, water repellents, flameproofing agents and fire retardants and dyes, but also further biocides, such as insecticides and/or fungicides. The application thereof can be effected in the same way as the application of the alkaline binder or of the insecticide. Examples of extenders and fillers are organic meals of cereals and lignocellulosic materials or inorganic meals. Oils and/or waxes, such as, for example, paraffins in solid form or as a dispersion, are usual examples of water repellents. Examples of flameproofing agents and fire retardants are, for example, boric acid, aluminium hydroxide, ammonium polyphosphates and mono- and diammonium phosphate.

Binders other than the alkaline binders can also be used for bringing the wood parts for optionally concomitantly used middle layers into contact. Preferably, however, the same preservative (insecticide) is used.

The following ingredients are preferably used:

85-97% by weight of wood parts
2-10% by weight of alkaline binders
0-10% by weight of non-alkaline binders
0.0002-0.02% by weight of thiacloprid
0-2% by weight of water repellent, based in each case on the finished wood-based material.

After the treatment of the wood parts with additives, as a rule the bed is scattered to give a mat comprising the wood parts. In the case of OSB, this is particularly preferred with optimal orientation of the strands. The strands treated according to step a) pass from scattering machine hoppers, preferably via application and distribution rolls, to the scattering heads provided with orienting apparatuses. The orientation of the outer layer in the production direction is preferably effected with the aid of disc orientors and the orientation of the middle layer is preferably effected in the transverse direction by means of compartmentalized rolls. Both the weight of the scattered mat and the proportions of outer layer relative to middle layer can be controlled via weighers. With the use of continuous presses, the mat is preferably scattered onto a revolving textile belt. From this belt, the mat can then be transferred to the steel belt of a press. With the use of multidaylight presses, the mat can be scattered onto revolving screen sections which are adapted to the heating plate length of the press. By transverse sawing of the mat in the region of the transitions, it is possible for these to be introduced individually into the loading apparatus of the press. Lateral trimming of the mat by a continuously movable means enables the production of different board widths.

In step b) of the process according to the invention the binder is cured in the press under the action of pressure and temperature, and the mat is pressed to the predetermined thickness. Mainly two press types are used within OSB production: the multidaylight presses and the continuous presses.

The preferred pressures during pressing are as a rule 100 to 500 N/cm$^2$. The preferred temperature is preferably 126 to 210° C., in particular 150 to 200° C.

The dwell time in the press is as a rule 4 to 15 seconds per mm of wood-based material thickness (board thickness).

The invention furthermore relates to the use of thiacloprid for protecting wood-based materials containing wood parts from attack and/or degradation by insects, in particular termites, characterized in that the wood-based materials contain alkaline binders. Otherwise, the abovementioned preferred ranges are applicable.

The invention furthermore relates to a wood-based material containing wood parts, containing wood parts containing at least one alkaline binder and thiacloprid.

Surprisingly high stability of the wood-based materials to termites was found as a result.

EXAMPLES

Example 1

Investigation of the Thermal Lability of Thiacloprid 5 g of NaOH were dissolved in 250 ml of distilled water (pH 13.7) and 100 mg of active substance were added. Stirring was then effected for 15 min at different temperatures. The mixture was extracted twice with methylene chloride, neutralized and evaporated down. The residue was weighed and was analysed by NMR, GC, GC-MS or HPLC.

Thiacloprid was stable at a temperature of 35° C. and underwent 100% degradation at a temperature of 75° C.

Example 2

Pine chips (strands for the production of OSB) whose fine fraction of <6 mm was removed by means of screening were wetted with phenol-formaldehyde glue (PF, manufacturer Georgia Pacific; type GP 155 C 42; pH about 11-13) for the outer layers and with polymethylene diisocyanate glue (PMDI; manufacturer Bayer; type Desmodur 1520 A 20) for the middle layer. The outer and middle layer chips treated in each case were then wetted with an aqueous solution containing 0.5% of thiacloprid and finally in each case with a wax emulsion (Sasolwax Hydrowax 730). The application was effected in each case using an atomizer (spinning disc system) in a chip mixer. The amount of alkaline binder was 4.5% of PF (or 2.5% of PMDI) solid resin mass fraction in the finished OSB board. This corresponds to about 10% mass fraction, based on the chips used, for the PF glue. The aqueous solution containing thiacloprid was used with 2000 ml/m$^3$ of finished OSB board. At a density of 650 kg/m$^3$, this corresponds to 0.00153% of thiacloprid, based on the finished OSB board. The proportion of wax was 0.8% by mass, based on the OSB board.

The OSB wood composites produced were produced from 60% of PF glue-coated chips as outer layers and 40% of PMDI glue-coated chips as the middle layer in a press at 500 N/cm$^2$ and with press plate temperatures of 190-200° C.

The finished boards had a density between 650 and 680 kg/m$^3$ and a thickness of 11-12 mm. The heating time factor was 12 s/mm (i.e. after application of the pressure, the board surfaces were in direct contact with the heated press plates for about 12 s/mm×12 mm=244 seconds). Samples of the OSB boards were subjected to tests analogous to EN 117 (termite resistance in compulsory test with the termite species *Reticulitermes santonensis*). The evaluation was effected by inspection of the surfaces after 8 weeks. No measurable traces of feeding were found on the test specimens while composite OSB materials without the addition of thiacloprid had pronounced traces of attack.

The invention claimed is:

1. A process for the production of a wood-based material, comprising the steps a) contacting a plurality of wood parts with
   a1) an alkaline binder having a pH of from 10 to 13.5, and
   a2) thiacloprid, thereby forming treated wood parts, and b) pressing a bed of wood parts under pressure at a temperature of 126° C. to 240° C. at the press contact surfaces, said bed of wood parts comprising treated wood parts according to step a), whereby said wood-based material is formed.

2. The process according to claim 1, wherein the wood-based material is selected from the group consisting of oriented strand boards, laminated wood, chipboards, and fibre boards.

3. The process according to claim 1, wherein the plurality of wood parts are selected from the group consisting of:

wood veneer layers, having a thickness of 0.5 to 5 mm and a length of 50 to 400 cm, wood chips having a width of 10 to 15 mm and a thickness of 0.6 to 0.8 mm and a length of 5 to 20 cm, wood chips having a length of 0.4 to 15 mm, and fibres having a length of 0.4 to 6 mm.

4. The process according to claim 1, wherein the alkaline binder is a phenol-formaldehyde and/or a phenol-urea-formaldehyde binder.

5. The aprocess according to claim 1, wherein the plurality of wood parts are present in an amount of 85-97% by weight;

the alkaline binders is present in an amount of 2-10% by weight;

the thiacloprid is present in an amount of 0.0002-0.02% by weight; and further comprising a water repellent present in an amount of 0.4-2% by weight, said aforementioned weight being based in each case on the wood-based material.

6. The process according to claim 1, wherein step b) is effected at a pressure of 100 to 500 $N/cm^2$.

7. The wood-based material obtained by the process of claim 1.

8. A method for protecting a wood-based material, comprising the steps a) contacting a plurality of wood parts with a1) an alkaline binder having a pH of from 10 to 13.5 and a2) thiacloprid and thereby forming treated wood parts, and b) pressing a bed of wood parts under pressure at a temperature of 126° C. to 240° C. at the press contact surfaces, said bed of wood parts comprising treated wood parts according to step a), whereby said wood-based material is protected.

* * * * *